United States Patent
Noda

(12) 
(10) Patent No.: US 6,423,453 B1
(45) Date of Patent: Jul. 23, 2002

(54) SOLID ELECTROLYTE BATTERY

(75) Inventor: Kazuhiro Noda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/374,592

(22) Filed: Aug. 16, 1999

(30) Foreign Application Priority Data

Aug. 20, 1998 (JP) .......................................... 10-234657

(51) Int. Cl.$^7$ ................................................ H01M 6/18
(52) U.S. Cl. ................................... 429/317; 429/231.95
(58) Field of Search ........................... 429/127, 231.95, 429/232, 218.1, 231.1, 231.2, 231.3, 231.4, 231.5, 221, 231.8, 317

(56) References Cited

U.S. PATENT DOCUMENTS

| | | |
|---|---|---|
| 4,816,357 A | 3/1989 | Hope et al. |
| 4,977,007 A | 12/1990 | Kondo et al. |

FOREIGN PATENT DOCUMENTS

| | | | |
|---|---|---|---|
| DE | 31 25 525 A1 | | 1/1983 |
| JP | 07-130359 A | * | 5/1995 |
| JP | 07-312221 | | 11/1995 |
| JP | 11-329409 A | * | 11/1999 |

OTHER PUBLICATIONS

Linden, D., Handbook of Batteries, 2nd edition, McGraw–Hill, Inc., NY 1995, Chapter 15 and pp. 36. 19–36.20 No month available.*

* cited by examiner

*Primary Examiner*—Carol Chaney
*Assistant Examiner*—Susy Tsang-Foster
(74) *Attorney, Agent, or Firm*—Sonnenschein, Nath & Rosenthal

(57) ABSTRACT

A solid electrolyte battery is to be provided which effectively creates contact between an electrolyte and an electrode and which is significantly improved in battery characteristics. A positive electrode 6 is made up of a positive electrode collector 4 and a layer of the positive electrode composition 5 mainly composed of a binder and powders of a positive electrode active material. The layer of the positive electrode composition 5 has a mean layer thickness $T_0$ which is within ±10% of the mean particle size $L_0$ of the powders of a positive electrode active material so that the powders 22 of the positive terminal active material are contacted with the positive electrode collector 4 and a solid electrolyte film 10. The negative electrode 9 is made up of a negative electrode collector 7 and a layer of the negative electrode composition 8 mainly composed of a binder and powders 23 of a negative electrode active material. The layer of the negative electrode composition 8 has a mean layer thickness $t_0$ which is within ±10% of the mean particle size $l_0$ of the powders 23 of a negative electrode active material so that the powders 23 of the negative terminal active material are contacted with the negative electrode collector 7 and a solid electrolyte film 10.

12 Claims, 3 Drawing Sheets

SOLID ELECTROLYTE BATTERY

RELATED APPLICATION DATA

The present application claims priority to Japanese Application No. P10-234657 filed Aug. 20, 1998, which application is incorporated herein by reference to the extent permitted by law.

BACKGROUND OF THE INVENTION

1. Field of the Invention

This invention relates to a solid electrolyte battery and, more particularly, to a lithium secondary battery or a lithium ion secondary battery exploiting the solid electrolyte. More particularly, it relates to a solid electrolyte battery superior in the electrode utilization factor, cyclic characteristics and in load characteristics and which can be increased in capacity.

2. Description of the Related Art

The lithium ion secondary battery is loaded on a wide variety of electronic equipments because of its high energy density. However, with the conventional lithium ion secondary battery, employing a combustible organic solvent, security against e.g., liquid leakage in case the battery is destroyed or fractured by some reason or other is not sufficient. In light of this, a solid electrolyte battery employing a solid electrolyte is stirring up notice.

In producing a solid electrolyte battery in general, high molecular organic compounds, exhibiting lithium ion conductivity, are coated on both of positive and negative electrodes, and the resulting two electrodes are stacked together. Alternatively, a solid electrolyte film is sandwiched between positive and negative electrodes to manufacture the battery. If the solid electrolyte is an organic compound having polymerizable functional groups, thermal or light polymerization steps are occasionally added in the battery manufacturing process.

This solid electrolyte battery is superior in safety and in energy density, while it can be reduced in size and thickness.

However, in this solid electrolyte battery, the following performance as the battery is not desirable.

That is, in the solid electrolyte battery, since both the electrolyte and the electrodes are solid, electro-chemical bonding between the particles of the active material of the electrodes and the solid electrolyte film on the electrode interface is inferior such that the interface impedance is significantly higher than with the battery of the electrolyte solution type to produce significant polarization, as a result of which the battery performance is significantly lowered.

As means for solving this problem, it has been proposed to use a compound electrode prepared on mixing a solid electrolyte to an electrode composition to increase the contact between the solid electrolyte and particles of the active electrode material.

However, with the method of employing the compound electrode, since many solid electrolytes are poor in their functions as the binder, such that it is difficult to realize a sufficient bonding strength between the current collector and the electrode composition. The result is that the layer of the electrode composition is collapsed, or the layer of the electrode composition is separated from the collector, due to expansion and contraction of the particles of the active electrode material consequent upon repeated charging/discharging, thus deteriorating cyclic characteristics. In order to prevent this phenomenon from occurrence, electrically conductive assistant agents need to be dispersed, as a result of which the battery capacity is lowered. Alternatively, complex processing, such as cross-linking, for improving the strength of the solid electrolyte used as a binder, is necessitated.

SUMMARY OF THE INVENTION

It is therefore an object of the present invention to provide a solid electrolyte battery in which contact between the electrolyte and the electrode is created to improve battery characteristics significantly.

In one aspect, the present invention provides a solid electrolyte battery having a positive electrode, a solid electrolyte and a negative electrode, wherein the positive electrode and/or the negative electrode is made up of a current collector and a layer of an electrode composition mainly composed of a binder and powders of an active electrode material. The electrode composition layer is layered on the current collector and has a mean layer thickness within ±10% of the mean particle size of the powders of an active electrode material.

In another aspect, the present invention provides a solid electrolyte battery having a positive electrode, a solid electrolyte and a negative electrode, wherein the positive electrode and/or the negative electrode is made up of a current collector and a layer of an electrode composition mainly composed of a binder and powders of an active electrode material. The powders of the electrode active material is adapted to be contacted with the current collector. The electrode composition layer is layered on the current collector and has a mean layer thickness within ±10% of the mean particle size of the powders of an active electrode material.

In the solid electrolyte battery according to the present invention, as described above in detail, the layer thickness of the layer of the electrode composition is set so as to be within a pre-set range with respect to the mean particle size, whereby the layer thickness of the electrode active material is approximately equal to each other, on an average, such that it is possible to charge the particles of the electrode active material evenly in the layer of the electrode composition without overlapping along the direction of thickness. Thus, the totality of the particles of the electrode active material are contacted with the solid electrolyte or the current collector to provide an optimum interface between the electrode active material and the solid electrolyte.

Moreover, in the solid electrolytic battery according to the present invention, since the particles of the electrode active material are formed to contact with the current collector to form a solid electrolytic between the two electrodes, both electron conduction paths and lithium ion conducting paths are formed optimally on the entire particles of the electrode active material.

Therefore, the solid electrolytic battery according to the present invention is a high-capacity solid electrolytic secondary battery having superior load characteristics and cyclic characteristics.

DESCRIPTION OF THE PREFERRED EMBODIMENTS

Figure 1:
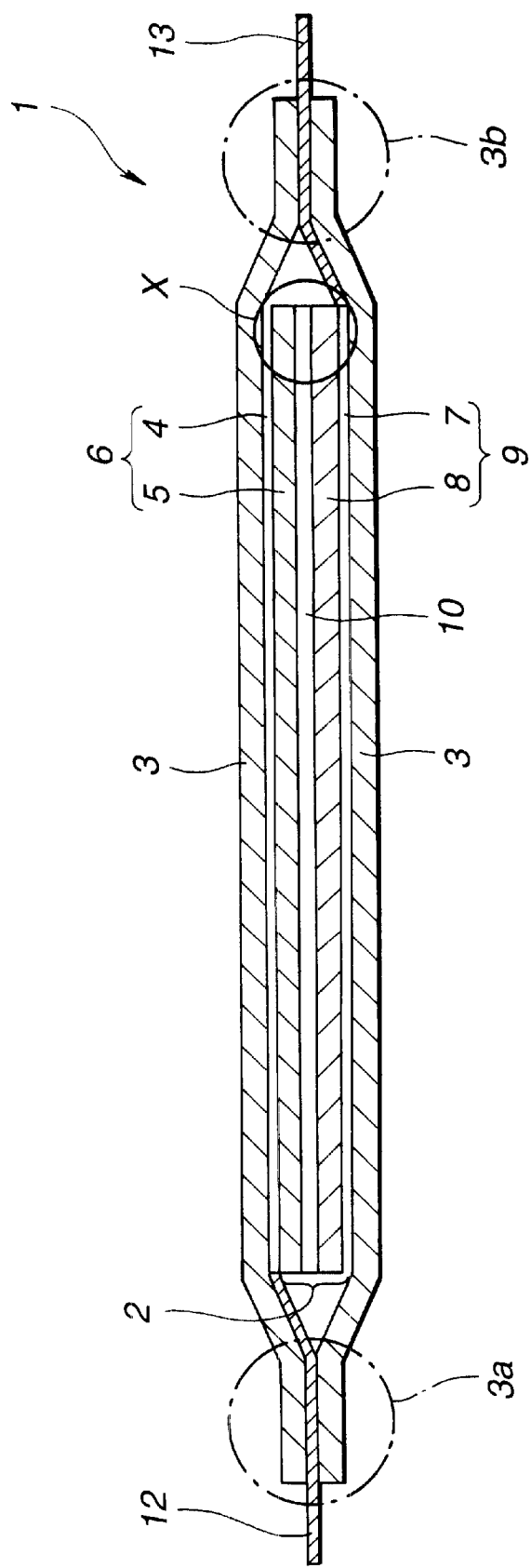
FIG. 1 is a cross-sectional view showing an embodiment of a solid electrolyte battery according to the present invention.

Referring to the drawings, preferred embodiments of the present invention will be explained in detail. FIG. 1 is a cross-sectional view showing a solid electrolyte battery 1 embodying the present invention.

A solid electrolyte battery 1 is comprised of a parallelepipedically-shaped layered electrode assembly 2 sandwiched between and tightly sealed between a pair of parallelepipedically-shaped outer films 3, as shown in FIG. 1. These outer films 3 are constituted by, for example, aluminum foils.

The layered electrode assembly 2 has a thin-sheet-shaped positive electrode 6 and a similarly thin-sheet-shaped negative electrode 9, facing each other with a solid electrolyte film 10 in-between.

The positive electrode 6 is a layered assembly of a positive electrode collector 4 and a layer of the positive electrode composition 5 mainly composed of a mixture of a binder, an electrically conductive assistant agent and a positive active electrode material 22, A positive electrode terminal 12 is connected to an end of the positive electrode collector 4, and is sandwiched at a sealed end 3a which is one end of the periphery of the outer films 3.

A negative electrode 9 is layered assembly of a negative electrode collector 7 and a layer of the negative electrode composition 8 mainly composed of a mixture of a binder and a negative active electrode material 23. A negative electrode terminal 13 is connected to an end of the negative electrode collector 7, and is sandwiched at a sealed end 3b which is the other end of the periphery of the outer films 3.

Figure 2:
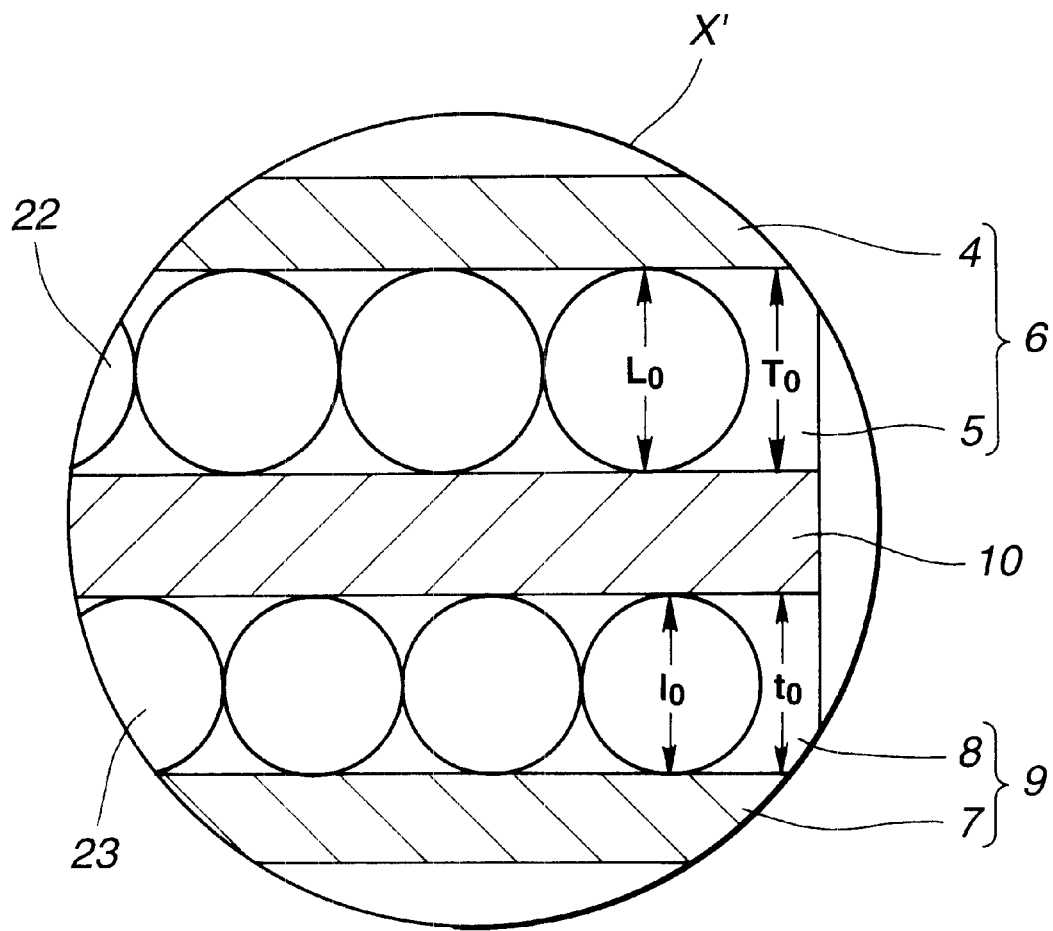
FIG. 2 is a cross-sectional view showing a range X in FIG. 1 to an enlarged scale.

In the solid electrolyte battery 1 of the present invention, the layer of the positive electrode composition 5 has a mean layer thickness $T_0$ which is ±10% of the mean particle size $L_0$ of the particle of the active positive electrode material 22, as shown in FIG. 2. That is, the values of $L_0$ and $T_0$ satisfy the relation: $L_0 \times 0.9 \leq T_0 \leq L_0 \times 1.1$. Thus, on average, the layer thickness of the layer of the positive electrode composition 5 is approximately equal to the particle size of the particle of the active positive electrode material 22 so that the particle of the active positive electrode material 22 is contacted with the solid electrolyte film 10 and the positive electrode collector 4.

Similarly, in the solid electrolyte battery 1 of the present invention, the layer of the negative electrode composition 8 has a mean layer thickness $t_0$ which is ±10% of the mean particle size $l_0$ of the particle of the active negative electrode material 23, as shown in FIG.2. That is, the values of $l_0$ and $t_0$ satisfy the relation; $l_0 \times 0.9 \leq t_0 \leq l_0 \times 1.1$. Thus, on average, the layer thickness of the layer of the negative electrode composition 8 is approximately equal to the particle size of the particle of the active negative electrode material 23 so that the particle of the active negative electrode material 23 is contacted with the solid electrolyte film 10 and the negative electrode collector 7.

Thus, with the solid electrolyte battery 1 of the present invention, the layer thicknesses of the electrode composition layers 5, 8 are prescribed to be within a preset range with respect to the mean particle size of the active electrode material, whereby the layer thicknesses of the electrode composition layers 5, 8 are approximately equal to the particle size of the active electrode material and hence the particles of the active electrode material can be packed in the electrode composition layers 5, 8 homogeneously without overlapping in the direction of the thickness. Therefore, the entire particles of the active electrode material can be contacted with the solid electrolyte film 10 or the current collectors 4, 7, without using a compound electrode in which the solid electrolyte is mixed into the electrode composition layers, thus improving the interface between the active electrode material and the solid electrolyte film 10.

Moreover, with the solid electrolyte battery 1 of the present invention, since the particles of the active electrode material are contacted with the current collectors 4, 7, and the solid electrolyte film 10 is formed between the electrodes, both the electron conducting path and lithium ion conducting path are satisfactorily formed in the entire particles of the active electrode material, so that it is possible to provide a solid electrolyte secondary battery having superior load characteristics.

The present invention thus provides a high-capacity solid electrolyte secondary battery having superior load characteristics and cyclic characteristics.

Although a meritorious effect of the present invention can be displayed by setting the layer thickness of one of the positive electrode composition layer or the negative electrode composition layer so as to be within a pre-set range with respect to the mean particle size of the associated active electrode material, it is naturally more effective to set the layer thicknesses of both the positive electrode composition layer and the negative electrode composition layer so as to be within a pre-set range with respect to the mean particle size of the active electrode material, as mentioned above.

The positive electrode collector 4 and the negative electrode collector 7 may be constituted by foils or sheets of metal, such as aluminum, nickel, titanium or copper.

There is no particular limitation to the active material for the positive electrode, such that any material known to be usable for the lithium secondary battery can be used. For example, the active material for the positive electrode may, for example, be enumerated by $LiCoO_2$, $LiMnO_2$, $LiNiO_2$, $LiVO_2$, $LiTiO_2$, $LiCo_{0.88}Ni_{0.2}O_2$, $LiMn_2O_4$, $TiS_2$, $MoS_2$, $FeS_2$ and FeS. The material may also be finely classified, if so desired.

The negative electrode active material, used in the present invention, may be enumerated by carbon materials, capable of occluding or desorbing lithium, in addition to metal lithium and lithium alloys capable of occluding and desorbing lithium. This carbon material may be enumerated by all sorts of the carbon materials, such as, for example, natural graphite, meso-phase pitch graphized carbon fibers, activated carbon or carbon black. The material may also be finely classified, if so desired.

The binder used for the layer of the positive electrode composition 5 and the layer of the negative electrode composition 8 may be enumerated by, for example, polyvinylidene fluoride. Since the binder having superior bonding performance, such as polyvinylidene fluoride, can be used in accordance with the present invention, it becomes possible to prevent electrode detachment with the use cycle to improve the cyclic performance. The solvent used in forming the layer of the positive electrode composition 5 and the negative electrode composition 8 may, for example, be N-methyl pyrrolidone.

The solid electrolyte film 10 in the present invention is composed of a solid electrolyte containing both the electrolyte and the high molecular material and separates the positive electrode 6 and the negative electrode 9. The electrolytes may be exemplified by $LiClO_4$, $LiPF_6$, $LiBF_4$, $LiAsF_6$, $LiAlCl_4$, $LiCF_3SO_3$, $LiN(CF_3SO_2)_2$ and $LiCF_3$. As the high molecular material, polyethylene oxide, polyether copolymers having an oligo-oxyethylene side chain, or other polyether copolymers having a crosslinked network structure, may be used. These may be used alone or in combination. If two or more high molecular materials are used in combination, the polymerization form may be block polymerization, random polymerization or any other suitable polymerization form. It is also possible to use compounds having a cross-linked network structure, including a semi-solid electrolyte, such as a gel electrolyte, consisting in the combination of a compound having a cross-linked network structure, such as polyacrylonitrile or polyvinylidene fluoride, with an organic solvent.

Instead of the high molecular material, inorganic solid electrolytes, such as ceramics, glass-ceramics or glass, represented by $Li_3N$, may also be used.

Although a thin type battery is taken as an example of the solid electrolyte battery 1 according to the present invention, this is merely illustrative and the solid electrolyte battery according to the present invention may also be applied to various shapes, such as square-shape, coin shape or a button shape.

EXAMPLES

The present invention is hereinafter explained with reference to specified Examples thereof based on experimental results. For evaluating the effect of the film thicknesses of the positive and negative electrode side separation films on the battery characteristics, a lithium secondary battery, shown below, was prepared.

Example 1

First, a positive electrode was fabricated in the following manner. Thus, $LiCoO2$, with a mean particle size of 20 μm, as a positive electrode active material, graphite powders, as an electrically conductive material, and polyvinylidene fluoride, as a binder, were weighed out at a weight ratio of 91:6:3 and mixed into N-methyl pyrrolidone, and the resulting mixture was sufficiently stirred to prepare a positive electrode composition. On a positive electrode current collector, constituted by an aluminum foil, the above-mentioned positive electrode composition was applied so that the $LiCoO_2$ particles will be free of overlapping and uniform in the direction of thickness, and was dried in situ. The resulting product was pressed to give a positive electrode. The coating thickness of the layer of the positive composition was 20 μm. The coating density was 2.31 g/cm$^3$.

A solid electrolyte film was also prepared in the following manner. First, 2.64 g of polyethylene oxide, having a molecular weight of approximately 10,000, and 0.53 g of $LiCl_4$, were dissolved in acetonitrile to give a homogeneous solution, which was then coated on the above-mentioned layer of the positive electrode composition. The resulting product was dried in situ to prepare a solid electrolyte film. The coating thickness of the solid electrolyte film was 70 μm.

A negative electrode then was prepared in the following manner. Thus, metal lithium was press-attached to a negative electrode collector, comprised of a copper foil 10 μm in thickness, to prepare a negative electrode.

The positive electrode and the negative electrode, thus prepared, were placed facing each other via a solid electrolyte film to prepare ultimately a thin type lithium secondary battery as shown in FIG. 1.

Comparative Example 1

First, a positive electrode was prepared in the following manner. Thus, $LiCoO_2$, with a mean particle size of 5 μm, as an active positive electrode material, graphite powders, as an electrically conductive agent, and polyvinylidene fluoride, as a binder, were weighed out to a weight ratio of 91:6:3 and mixed into N-pyrrolidone. The resulting mixture was stirred On a positive electrode current collector, constituted by an aluminum foil, the above-mentioned positive electrode composition was applied so that the $LiCoO_2$ particles will be free of overlapping and uniform in the direction of thickness, and was dried in situ. The resulting product was pressed to give a positive electrode. The coating thickness of the layer of the positive composition was 20 μm. The coating density was 2.38 g/Cm$^3$.

A solid electrolyte film and a negative electrode were produced in the same way as in Example 1 except producing the positive electrode as described above to prepare a thin type lithium secondary battery.

Evaluation of the Charging/Discharging Properties of the Battery

The lithium secondary batteries of the Example 1 and the Comparative Example 1, prepared as described above, were subjected to repeated charging/discharging, with the charging voltage of 4.2 V, charging voltage of 3.0 V and the charging/discharging current of 0.2 mA, and the electrode utilization factor was calculated from the respective discharging capacities when the same battery was charged/discharged with the charging/discharging currents of 0.4 mA and 0.8 mA. The results are shown in Table 1.

TABLE 1

|  | utilization factor | | |
| --- | --- | --- | --- |
| charging/discharging current | 0.2 mA | 0.4 mA | 0.8 mA |
| Ex.1 | 100% | 98% | 95% |
| Comp. Ex.1 | 100% | 65% | 18% |

As may be seen from the results of Table 1, the battery of Example 1, in which the mean layer thickness of the layer of the positive electrode composition is within ±10% of the mean particle size of the powders of the active material of the positive electrode, is markedly superior in the battery utilization factor to the Comparative Example 1 in which the mean layer thickness of the layer of the positive electrode composition is not within the above ratio.

Thus, it is seen that, by setting the mean layer thickness of the layer of the positive electrode composition so as to be within a pre-set range with respect to the mean particle size of the powders of the active positive electrode material, contact between the active material of the positive electrode on one hand and the solid electrolyte and the current collector on the other hand is improved to improve the battery utilization factor.

Example 2

First, a positive electrode and a solid electrolyte film were fabricated in the same way as in Example 1.

Then, particulate graphite, with a mean particle size of 10 μm, as an active material for a negative electrode, and polyvinylidene fluoride, as a binder, were sufficiently stirred in N-methyl pyrrolidone, at a ratio of 90:10, to prepare a negative electrode composition. On a negative electrode current collector, constituted by a copper foil, the above-mentioned negative electrode composition was applied so that the graphite particles will be free of overlapping and uniform in the direction of thickness. The resulting product then was dried in situ and pressed to give a positive electrode. The coating thickness of the layer of the positive composition was 10 μm.

The positive electrode and the negative electrode, thus prepared, were placed facing each other via a solid electrolyte film to prepare ultimately a thin type lithium secondary battery as shown in FIG. 1.

Comparative Example 2

A positive electrode and a solid electrolytic were prepared in the same way as in Comparative Example 1, and a thin type lithium secondary battery was prepared in the same way as in Example 2. Evaluation of Charging/Discharging Characteristics of the Battery The lithium secondary batteries of the Example 2 and the Comparative Example 2, prepared as described above, were subjected to repeated charging/discharging, with the charging voltage of 4.2 V, charging voltage of 3.0 V and the charging/discharging current of 0.2 mA, and measurements were made of the discharging capacity in each cycle to evaluate cycle characteristics. The results are shown in FIG. 3.

Figure 3:
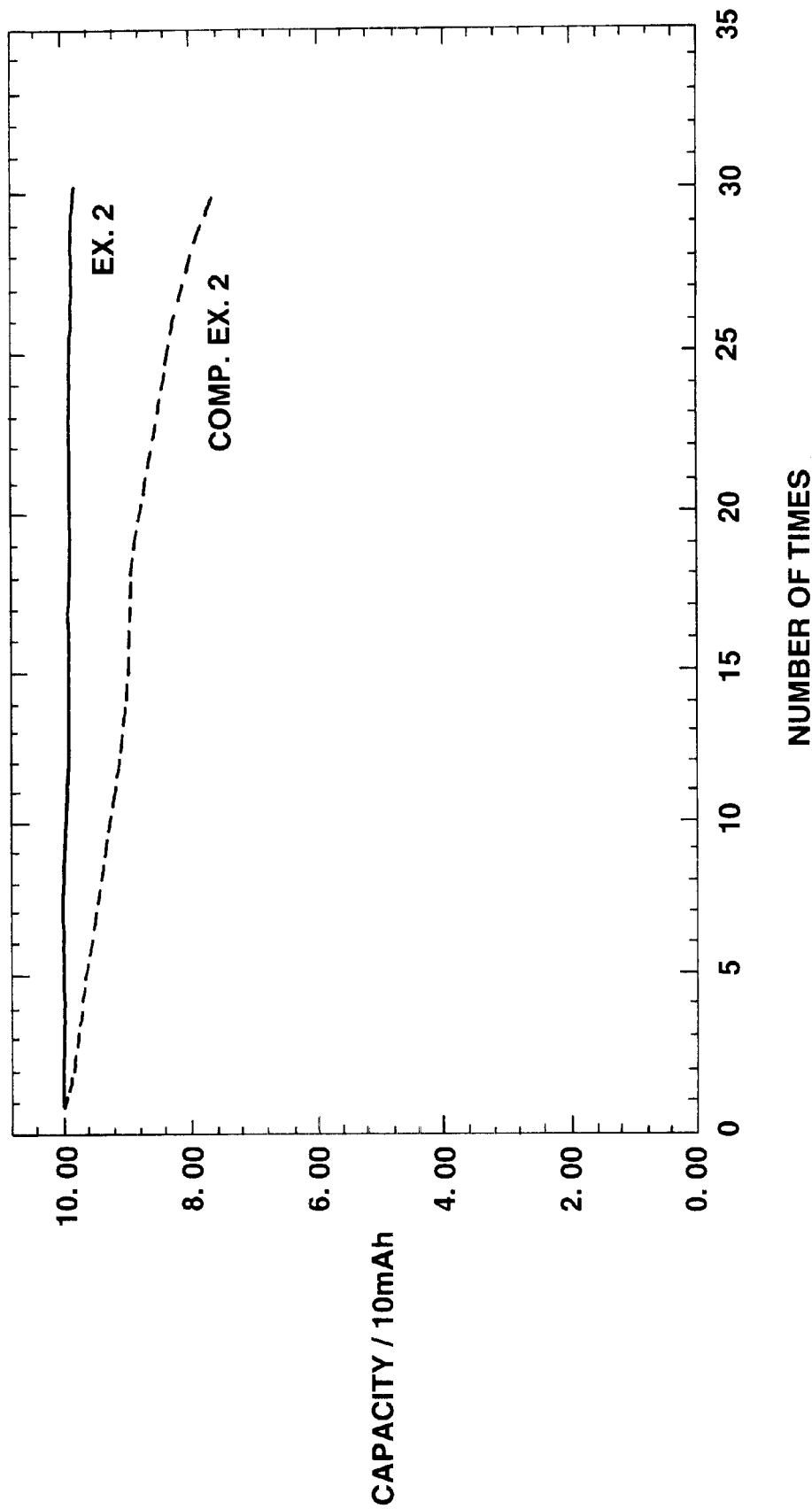
FIG. 3 shows the results of evaluation of cyclic characteristics.

As may be seen from the results of FIG. 3, the battery of Example 2, in which the mean layer thickness of the layer of the positive electrode composition in the positive electrode and that of the layer of the negative electrode composition in the negative electrode are within a pre-set range with respect to the mean particle size of the powders of the active material of the positive electrode and that of the active material of the negative electrode, is markedly superior in the cyclic characteristics to the Comparative Example 2 in which the mean layer thicknesses of the layers of the positive and negative electrode compositions are not within the above range.

Thus, it is seen that, by setting the mean layer thicknesses of the layers of the positive and negative electrode compositions so as to be within a pre-set factor with respect to the mean particle size of the powders of the active positive electrode material and that of the active negative electrode material, contact between the active material of the positive electrode and that of the negative electrode on one hand and the solid electrolyte and the current collector on the other hand is improved to improve the cyclic characteristics.

What is claimed is:

1. A solid electrolyte battery comprising;
   a positive electrode and a negative electrode, each of said positive electrode and said negative electrode comprising a current collector and a layer of an electrode composition mainly comprised of a binder and at least one powder of an active material, said electrode composition layer being layered on said current collector, the electrode composition layer having a mean layer thickness within ±10% of the mean particle size of the powders of the active material; and
   a polymer electrolyte, said polymer electrolyte comprising an electrolyte salt and a polymer material, said polymer material comprising at least one of polyethylene oxide, polyether copolymers having an oligo-oxyethlene side chain, and polyether copolymers having a cross-linked network structure.

2. The solid electrolyte battery according to claim 1 wherein said electrolyte salt is formed of a lithium ion electrically conductive material.

3. The solid electrolyte battery according to claim 1 wherein the positive electrode active material comprises at least one of $LiCoO_2$, $LiMnO_2$, $LiNiO_2$, $LiVO_2$, $LiTiO_2$, $LiCo_{0.88}Ni_{0.2}O_2$, $LiMn_2O_4$, $TiS_2$, $MoS_2$, $FeS_2$, and $FeS$.

4. The solid electrolyte battery according to claim 1 wherein the negative electrode active material comprises at least one of metal lithium, lithium alloys and a carbon material capable of occluding and desorbing lithium.

5. The solid electrolyte battery according to claim 4 wherein said carbon material comprises at least one of natural graphite, mesophase pitch graphized carbon fibers, activated carbon and carbon black.

6. The solid electrolyte battery according to claim 1 wherein said electrolyte salt comprises at least one of $LiClO_4$, $LiPF_6$, $LiBF_4$, $LiAsF_6$, $LiAlCl_4$, $LiCF_3SO_3$, $LiN(CF_3SO_2)_2$ and $LiCF_3$.

7. A solid electrolyte battery comprising:
   a positive electrode and a negative electrode, each of said positive electrode and said negative electrode comprising a current collector and a layer of an electrode composition mainly comprised of a binder and at least one powder of an active material, said powders of the active material being adapted to be contacted with said current collector, said electrode composition layer being layered on said current collector, the electrode composition having a mean layer thickness within ±10% of the mean particle size of the powders of the active material; and
   a polymer electrolyte, said polymer electrolyte comprising an electrolyte salt and a polymer material, said polymer material comprising at least one of polyethylene oxide, polyether copolymers having an oligo-oxyethlene side chain, and polyether copolymers having a cross-linked network structure.

8. The solid electrolyte battery according to claim 7 wherein said electrolyte salt is formed of a lithium ion electrically conductive material.

9. The solid electrolyte battery according to claim 7 wherein the positive electrode active material comprises at least one of $LiCoO_2$, $LiMnO_2$, $LiNiO_2$, $LiVO_2$, $LiTiO_2$, $LiCo_{0.88}Ni_{0.2}O_2$, $LiMn_2O_4$, $TiS_2$, $MoS_2$, $FeS_2$, and $FeS$.

10. The solid electrolyte battery according to claim 7 wherein the negative electrode active material comprises at least one of metal lithium, lithium alloys and a carbon material capable of occluding and desorbing lithium.

11. The solid electrolyte battery according to claim 10 wherein said carbon material comprises at least one of natural graphite, mesophase pitch graphized carbon fibers, activated carbon and carbon black.

12. The solid electrolyte battery according to claim 7 wherein said electrolyte salt comprises at least one of $LiClO_4$, $LiPF_6$, $LiBF_4$, $LiAsF_6$, $LiAlCl_4$, $LiCF_3SO_3$, $LiN(CF_3SO_2)_2$ and $LiCF_3$.

* * * * *